March 8, 1949.  F. J. WRIGHT  2,464,110
HYDRAULIC SYSTEM FOR VEHICLE
STEERING AND OTHER APPARATUS
Filed Nov. 27, 1944  7 Sheets-Sheet 1

INVENTOR;
FRED J. WRIGHT,
BY
ATT'Y.

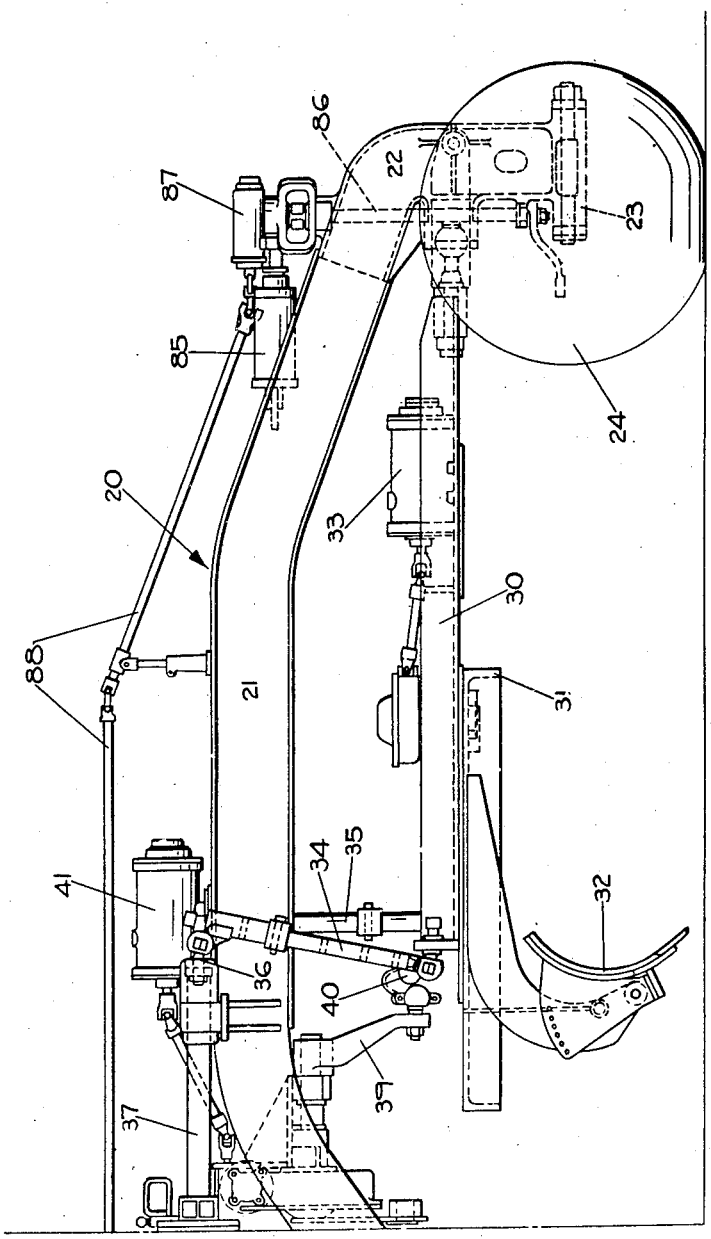

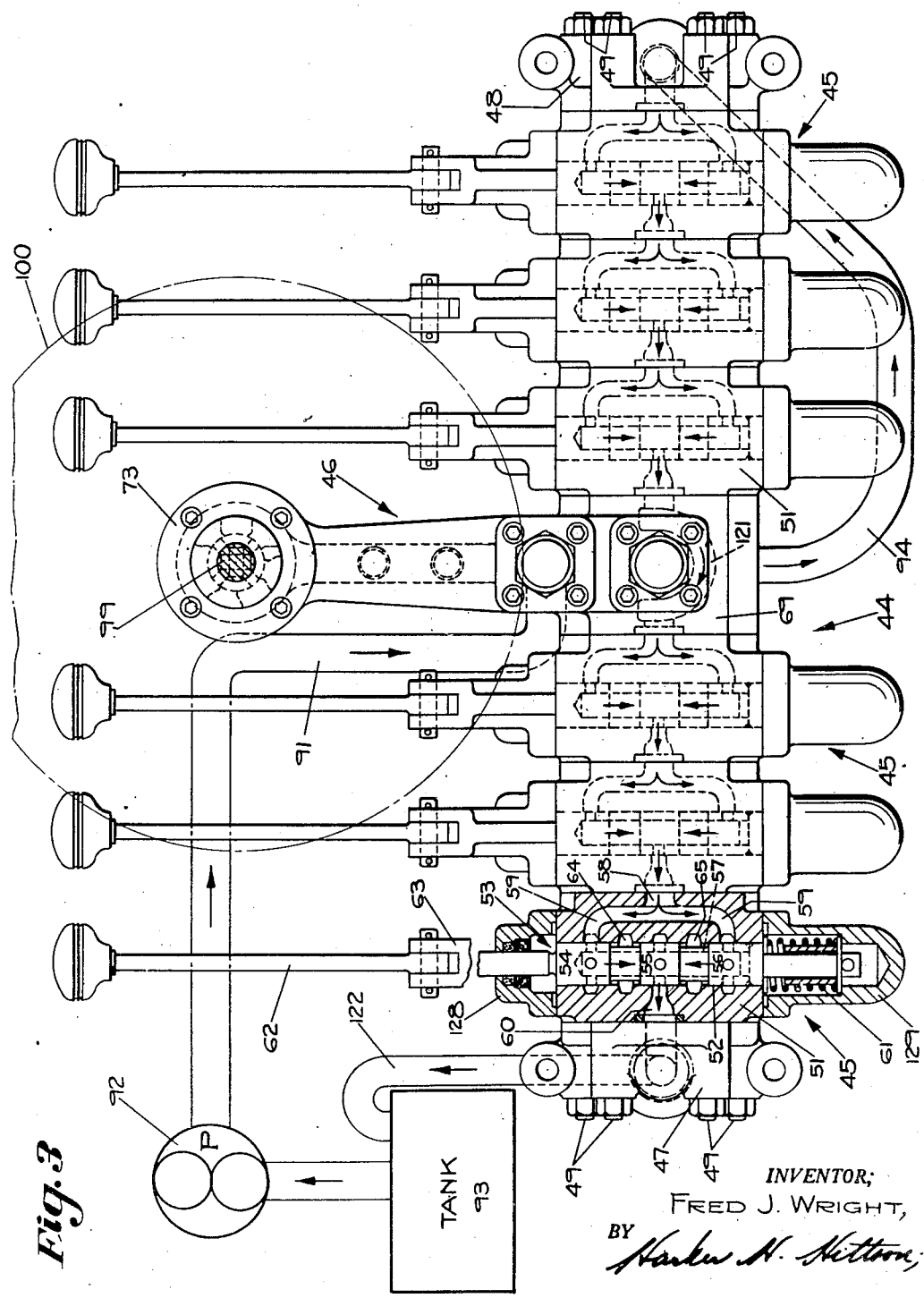

March 8, 1949.  F. J. WRIGHT  2,464,110
HYDRAULIC SYSTEM FOR VEHICLE
STEERING AND OTHER APPARATUS
Filed Nov. 27, 1944  7 Sheets-Sheet
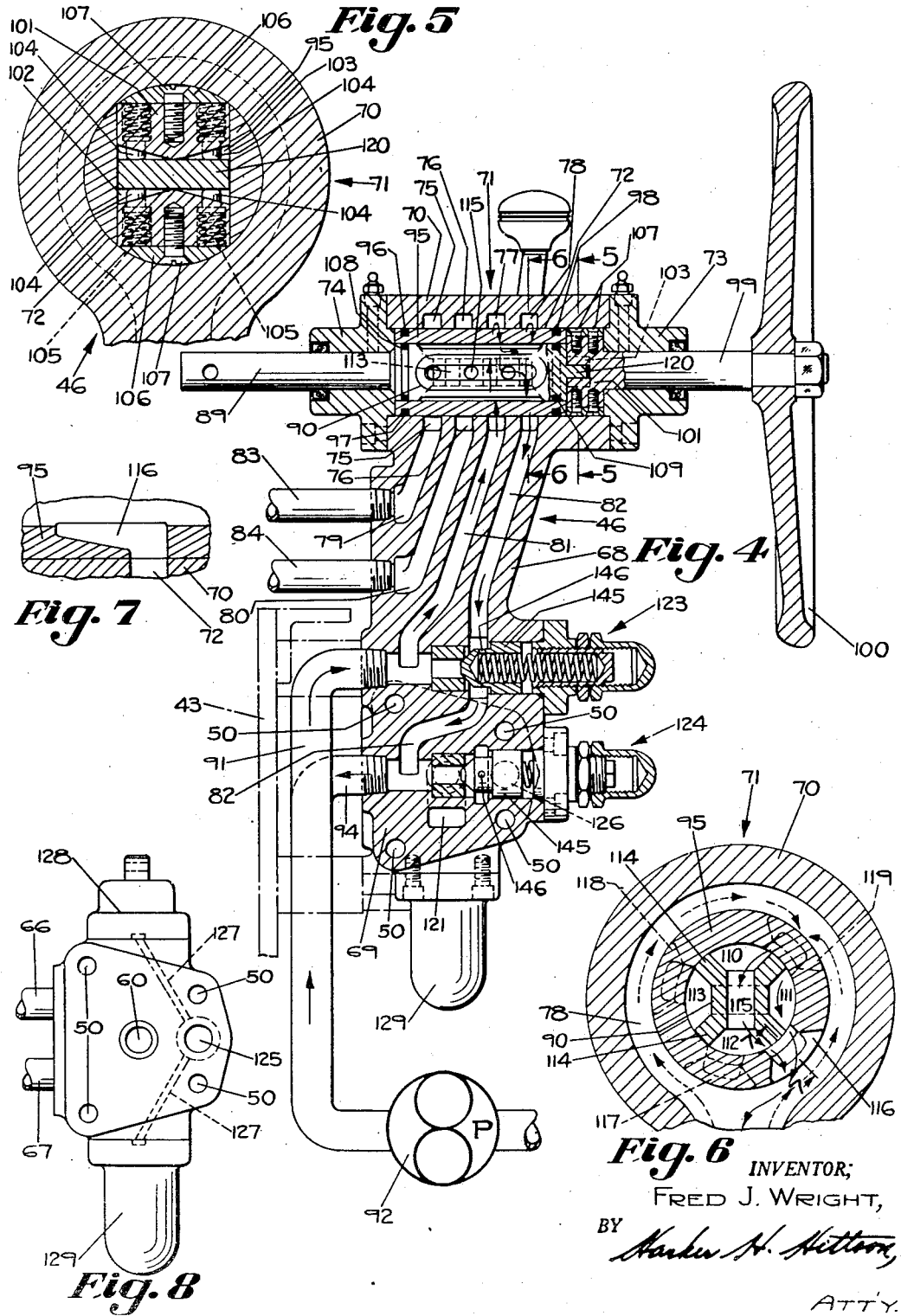
INVENTOR;
FRED J. WRIGHT,
BY
ATTY.

March 8, 1949.

F. J. WRIGHT 2,464,110

HYDRAULIC SYSTEM FOR VEHICLE
STEERING AND OTHER APPARATUS

Filed Nov. 27, 1944

INVENTOR:
FRED J. WRIGHT,
BY
ATT'Y.

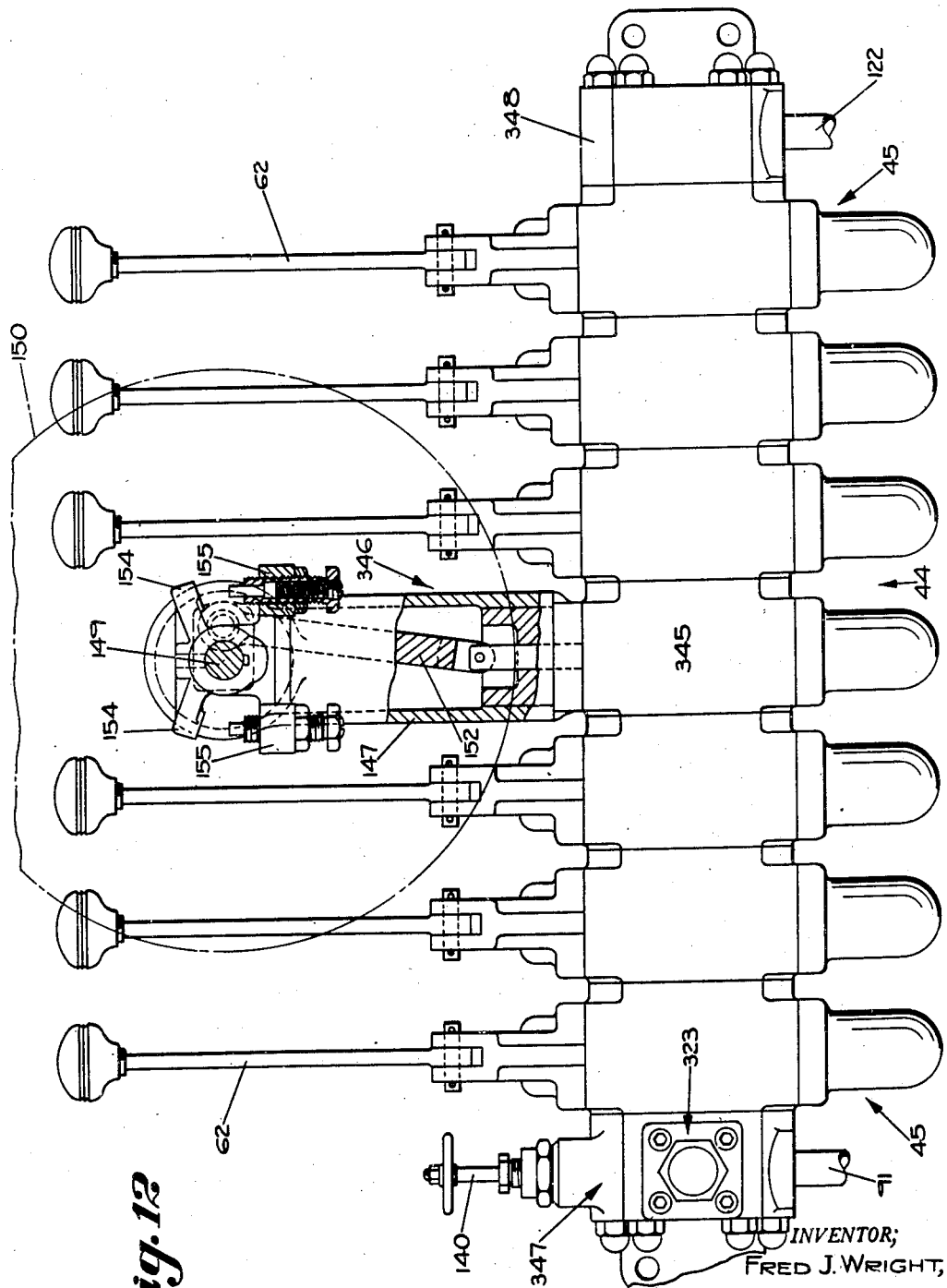

March 8, 1949.　　　　　　　　F. J. WRIGHT　　　　　　　2,464,110
HYDRAULIC SYSTEM FOR VEHICLE
STEERING AND OTHER APPARATUS
Filed Nov. 27, 1944　　　　　　　　　　　　　　　　　7 Sheets-Sheet 7
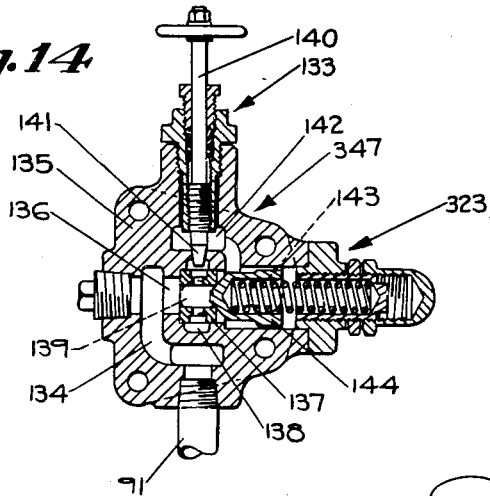
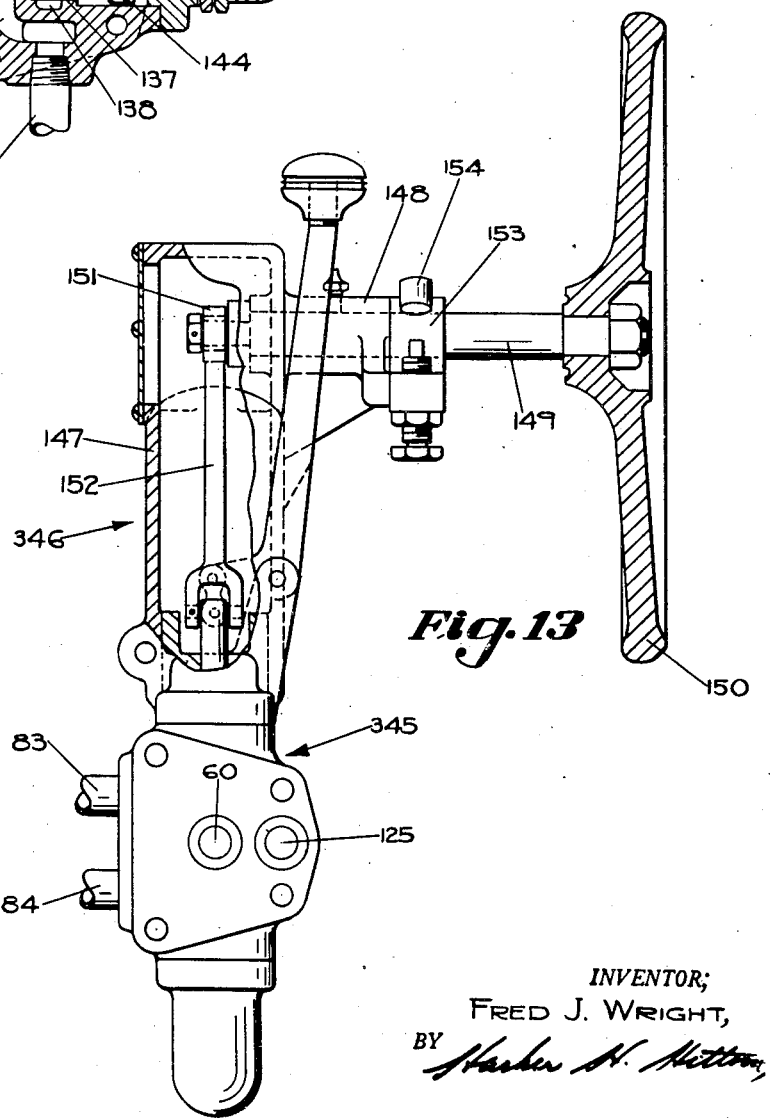
INVENTOR;
FRED J. WRIGHT,
BY
ATT'Y.

Patented Mar. 8, 1949

2,464,110

UNITED STATES PATENT OFFICE 2,464,110

HYDRAULIC SYSTEM FOR VEHICLE STEERING AND OTHER APPARATUS

Fred J. Wright, Upper Arlington, Ohio, assignor to The Galion Iron Works & Manufacturing Company, a corporation of Ohio Application November 27, 1944, Serial No. 565,356

4 Claims. (Cl. 180—79.2)

This invention relates to a hydraulic system and apparatus particularly designed for controlling various operations of a vehicle, such as a road grader.

An object of the invention is to provide an improved hydraulic system and apparatus of the above mentioned type.

A more specific object of the invention is to provide a hydraulic control system and apparatus for a steerable vehicle in which the hydraulic fluid is delivered to a plurality of control valves in series, the first of which control valves controls the steering of the vehicle, and in a more specific embodiment of the invention, in which a high pressure relief by-pass valve is provided for the steering valve which when operated delivers the by-passed fluid to the system for subsequent use therein.

Another object of the invention is to provide a hydraulic control system including a plurality of valves, one of which is a steering valve in which there are two pressure relief by-pass valves, one for the steering valve, the other for all the additional valves, the arrangement being such that when the steering valve by-pass is open, the hydraulic fluid will be delivered for use by the other valves, and when the other high pressure relief valve is open, the fluid will be by-passed to tank.

A further object of the invention is to provide a group of banked individual hydraulic valves having individual valve casings, one of which is controlled by a steering wheel, and in a more specific aspect of the invention includes a rotary steering wheel valve.

A further object of the invention is to provide a hydraulic apparatus in the form of a bank of individual valves of separable valve housings, one of which includes an upstanding post which in a more specific aspect of the invention includes feed and discharge passageways therein leading to a valve, which may be of the rotary type, in the top of said post.

Another object of the invention is to provide a combination valve and steering post which preferably has feed and discharge passages which lead to and from a valve, preferably a rotary valve, in the top thereof, and which in a more specific aspect of the invention also is provided with one or more high pressure relief by-pass valves in its base and in a still more specific aspect of the invention also includes a drain passageway formed in the post for draining leakage hydraulic fluid from a valve in the top of the post to a drain or tank passageway.

Still another object of the invention is to provide an improved hydraulic apparatus in the form of an upstanding post which houses a steering valve in the top and a relief valve or valves in the bottom.

Another object of the invention is to provide an improved rotary valve having a shell formed to obtain the desirable area of hydraulic passageway, though bridged by a core.

Other objects of the invention will appear hereinafter, the novel features and combinations being set forth in the appended claims.

In the accompanying drawings,

Figs. 1 and 2, placed end to end, constitute a side elevational view of a vehicle in the form of a road grader incorporating the features of my invention;

Fig. 3 is an elevational view of the banked valves, with one of the valves shown in section and with the steering wheel merely indicated in dotted lines, the hydraulic circuit also being illustrated in this figure of the drawings;

Fig. 4 is a sectional elevational view through the center of the steering post and valve. This figure also includes a portion of the hydraulic circuit;

Fig. 5 is a transverse sectional view taken on the line 5—5 of Fig. 4, looking in the direction of the arrows;

Fig. 6 is a transverse sectional view taken on the line 6—6 of Fig. 4, looking in the direction of the arrows;

Fig. 7 is an enlarged sectional view taken on the line 7—7 of Fig. 6, looking in the direction of the arrows, and with the spider or core omitted;

Fig. 8 is an end elevational view of one of the valves of Fig. 3;

Fig. 9 is a view, similar to Fig. 4, of a modified form of post and steering valve;

Fig. 10 is a sectional view taken on the line 10—10 of Fig. 9;

Fig. 11 is an enlarged side view of the shell of the steering valve of Figs. 9 and 10, with parts broken away and shown in section;

Fig. 12 is a front elevational view of a modified form of banked valve and steering wheel control valve, the steering wheel being illustrated only diagrammatically, and portions of the operating mechanism for the steering valve being shown in section;

Fig. 13 is a combination side elevational and sectional view of the banked valves of Fig. 12, with some of the valves omitted; and Fig. 14 is a sectional view of the combination adjustable leakage or by-pass and high pressure relief valve which forms one of the elements of the banked valves of Fig. 12.

Figure 1:
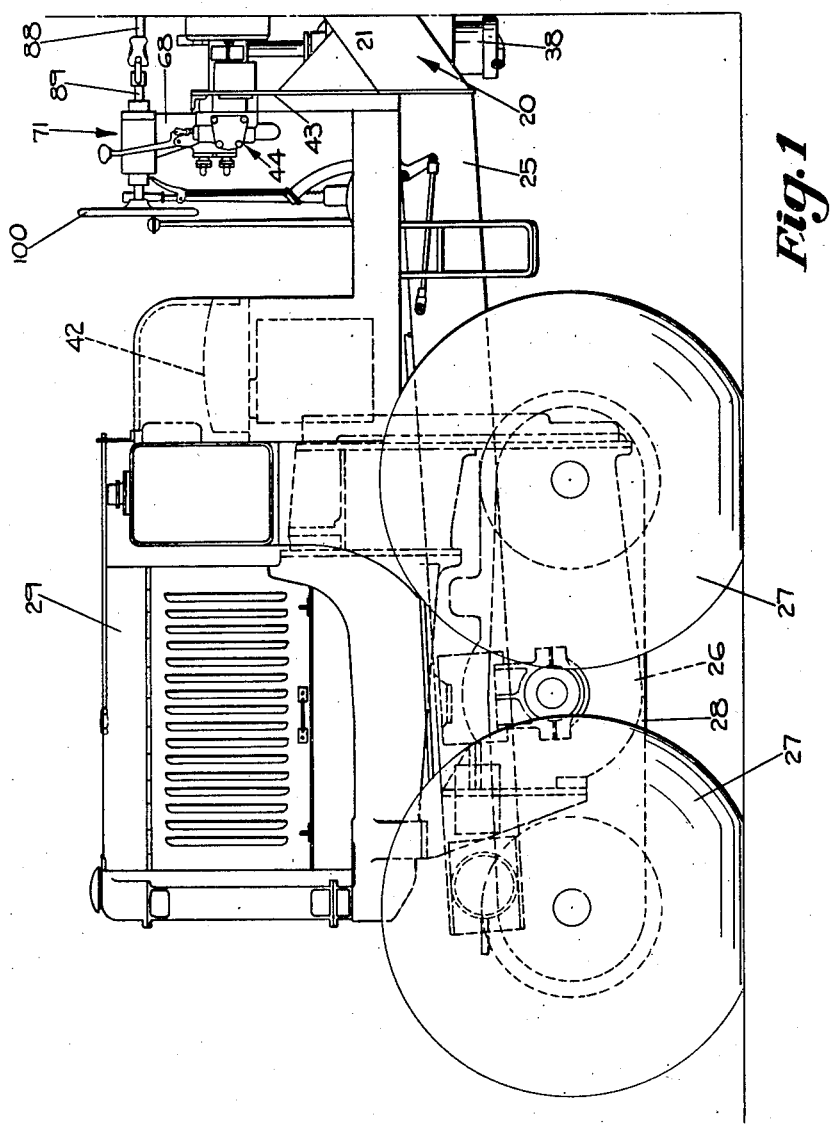

The hydraulic system and apparatus herein disclosed may be used in a variety of different places or with a variety of different vehicles. One vehicle where it is particularly adapted to be used is a road grader, such as that disclosed in more detail in the patent to Franklin E. Arndt, No. 2,340,169, dated January 25, 1944, for a Road grader.

In Figs. 1 and 2 of the drawings, I have illustrated a road grader comparable to that of the Arndt patent, with my improved hydraulic system incorporated therein. It is to be understood that unless a contrary fact is indicated, the structure of the grader herein illustrated, follows that of said patent.

Briefly described, the grader comprises a main frame 20 formed of a pair of elongated channel members 21 which are connected together adjacent their forward ends and terminate in a head casting 22 at the bottom of which a front axle 23 is pivotally connected, which carries a pair of front steering wheels 24 which preferably can be leaned by a double acting hydraulic piston motor in a manner well understood in the road grader art.

At their rear ends the channel members 21 are spaced apart and are provided with extensions 25 which may be welded thereto, which extend above and are connected to a rear axle housing 26 which includes drive mechanism for driving the tandem rear wheels 27, preferably mounted on a pivoted gear casing 28 pivotally mounted on the rear axle housing 26. The rear tandem driving wheels 27 are driven through a gear train leading from a motor located under the hood 29, as well understood in the road grader art.

Extending rearwardly from the head casting 22 is a drawbar 30 provided with a circle 31, upon which a moldboard 32 is adjustably carried. Adjustment of the circle 31 is by a double acting or reversible rotary hydraulic motor 33 and associated drive.

To provide for up and down and lateral adjustment of the moldboard 32, the grader includes a pair of lift links or hang rods 34 and 35 connected to opposite sides of a rear cross-piece of the drawbar 30. The hang rods 34 and 35 are on opposite sides of the vehicle main frame 20 and are carried by upwardly extending crank arms, one of which is seen at 36. These crank arms are mounted on shafts, one of which is seen at 37 and are rotated by double acting hydraulic piston motors, that for shaft 37 being seen at 38.

To effect lateral shifting of the rear end of the drawbar 30, the grader includes a crank arm 39 which is connected to the rear end of the drawbar by lateral shift link 40. The crank arm 39 is swung about its mounting shaft through a reduction gear drive from a double acting or reversible hydraulic motor 41. If desired, the grader may be provided with an adjustable scarifier operable by a double acting hydraulic piston motor, as disclosed in detail in the above mentioned Arndt patent.

In front of an operator's seat 42 is a dashboard 43 upon which is removably bolted a bank of individual valves, the bank as a whole being designated 44 and being illustrated in some detail in Fig. 3 of the drawings. As illustrated in Fig. 3 of the drawings, the bank 44 is formed of six duplicated or identical slide valves, each individually designated by the character 45. The number of these complete slide valves 45 may be varied as desired by the simple expedient of adding or removing a complete valve unit.

In addition to the identical slide valves 45, the bank 44 includes a special arrangement involving a rotary valve and a pair of high pressure relief valves as well as a steering post, the complete post assembly being designated 46. As illustrated in Fig. 3 of the drawings, the post 46 is centrally located with respect to the individual slide valves 45, but this location is entirely optional and the post 46 may be situated any place with respect to the individual slide valves 45.

In addition to the individual slide valves 45 and the post 46, the complete manifold formed of the banked valves 44 includes a pair of end plates 47 and 48 located on opposite ends, and four through bolts 49 provided with appropriate nuts which extend through four bores 50 (see Figs. 4 and 8) which are formed in the end plates 47 and 48 and in the main castings or casings of the individual valves 45 and in the base of the post 46.

The structure of the individual valves 45 is disclosed in complete detail in my application, Serial No. 627,848, entitled Hydraulic valve, filed November 10, 1945, as a continuation of application, Serial No. 496,634 for a Hydraulic system, filed July 29, 1943, the latter application having been abandoned, and except for the difference obvious from the description herein contained, it is understood that both the valves and the system of this application follow the disclosure of that application.

Briefly described, each of the valves 45 includes a main casting, casing or body 51 which has two opposite flat parallel surfaces so that it can fit up against an adjacent co-operating complementary surface of a similar valve 45 or an end plate 47 or 48, as the case may be. The casting 51 is provided with a longitudinal central bore 52 in which a sliding spool 53 is adapted to slide. The spool 53 is centrally bored and provided with three spaced-apart lands 54, 55 and 56. Each of the lands 54, 55 and 56 is provided with radially extending drill holes communicating with an interior bore 57 of the spool 53.

When the spool 53 is in its normal position, as illustrated in Fig. 3 of the drawings, hydraulic fluid delivered to a central port 58 in the casting 51, will flow through forked passageways 59 and to chambers in said casting 51 surrounding the lands 54 and 56, with the chambers in alignment with the radial bores in said lands 54 and 56 through which the hydraulic fluid will flow to the longitudinal bore in spool 53 and thence out the radial bores of land 55 to a central port 60 which aligns with a receiving passageway in the end plate 47 or with a port 58 of an adjacent valve 45, as the case may be. The spool 53 is held in its normal or neutral position, as viewed in Fig. 3, by centering spring mechanism 61, the structure of which is well known in this art. Operation of the spool 53 in opposite directions from its neutral position is effected by an associated control lever 62 pivotally mounted on a supporting bracket 63.

The casting or housing 51 is provided with cylinder or motor chambers 64 and 65 which are on opposite sides of the central land 55 and adjacent reduced portions of the spool 53 when said spool is in its normal position. The chambers 64 and 65 are connected by passageways to conduits 66 and 67, respectively (see Fig. 8), which are the feed and return conduits leading to and from a double acting hydraulic motor, such as double acting rotary hydraulic motor 33 or double acting piston motor 38.

It is, of course, obvious that there will be an individual control valve 45 for each of the reversible or double acting rotary or piston motors on the vehicle. For example, the double acting piston motors, one of which is seen at 38, will each have an individual control valve 45. Likewise, reversible motors 33 and 41 will have individual control valves 45. The control valve for steering the front wheels 24 is that associated with the post 46 and is described more completely hereinafter.

Attention is now directed particularly to Figs. 3 and 4 of the drawings and to the structure of the steering post 46 and associated valves. Said post 46 includes a main body, casting or casing 68 which is in the form of an upwardly extending member having a base portion 69 which has a pair of flat parallel side surfaces preferably having the same distance apart as the flat parallel side surfaces of a valve 45 so that such a valve 45 can be substituted for the post 46, if desired, without requiring different mountings for the manifold which is formed by the bank of valves 44. As clearly illustrated in Fig. 4 of the drawings, this base portion 69 includes the bores 50 through which the tie bolts 49 extend.

The upper end of the post casting 68 is provided with an integral generally cylindrical portion 70 which forms a head and constitutes the main body or casing of a rotary steering valve 71. The head 70 is provided along its longitudinal axis with a cylindrical bore 72 which is closed at its front by removable end cap 73 and at its rear by removable end cap 74.

Communicating with the cylindrical bore 72, or, in other words, formed on the interior surface of the head 70 are four longitudinally spaced peripheral passageways or grooves 75, 76, 77 and 78. The passageways or grooves 75, 76, 77 and 78 communicate with upwardly extending passageways 79, 80, 81 and 82, respectively, which are formed in the intermediate section of the post 46 or, in other words, between the base 69 and the head 70 thereof.

The rear face of the casting 68 is provided with threaded openings to receive hydraulic conduits, there being a conduit leading to each of the passageways 79, 80, 81 and 82. Conduits 83 and 84 are cylinder or motor conduits and they are connected with passageways 79 and 80, respectively. These two conduits 83 and 84 extend forwardly along the main frame 20 of the road grader and deliver hydraulic fluid to and from a double acting hydraulic piston motor 85 which is at the front end of said vehicle and which oscillates an upright steering shaft 86 of a steering mechanism for front wheels 24 through a crank arm which is connected thereto and to the piston of the motor 85.

Furthermore, the oscillating movement of the shaft 86 is fed back through reduction gearing 87 which is connected to said shaft 86 and through a steering rod 88 preferably provided with an adequate number of universal joints, as clearly illustrated in Figs. 1 and 2 of the drawings, said rod 88 being connected to a stub shaft 89 (see Fig. 4), which extends through the rear end cap 74 and is formed as an integral part of a spider or core 90 of the valve 71, the structure of which core or spider is described in full detail hereinafter.

It may also be mentioned at this time that in case of failure of the hydraulic system, the piston head of the motor 85 may be disconnected from the lever arm which is connected to steering shaft 86, and a direct mechanical steer may be effected for the front wheels 24 through the steering rod 88, reduction gear 87, etc.

Connected with the previously mentioned passageway 81 in the casting 68 is a feed or pressure conduit 91 leading from a pump 92 which derives hydraulic fluid from a tank 93. The pump 92 is preferably driven from the main motor of the road grader and is a source of hydraulic fluid under pressure for the hydraulic system.

The previously described passageway 82 is connected with a conduit 94 which leads to the end plate 48 and through a passageway therein communicates with the port 58 of the right hand valve 45, as viewed in Fig. 3 of the drawings, which is the first of the slide valves 45 in the hydraulic system, following the rotary valve 71 which precedes it in said system for a reason hereinafter described more completely.

Returning to a consideration of the structure which makes up the rotary steering valve 71, rotatably mounted within the cylindrical bore 72 and having a close fit therewith is a rotatable cylinder, sleeve, or shell 95 which extends longitudinally beyond the end grooves 75 and 78 and abuts the end caps 73 and 74. Adjacent its rear or left-hand end the cylinder 95 is provided with a groove 96 which receives an O-ring 97 providing a seal between this portion of the sleeve 95 and the interior cylindrical surface of the head 70. A cylinder groove and O-ring seal 98 is provided near the right hand or front portion of the sleeve or shell 95.

Extending through the cap 73 is a steering wheel shaft 99 having a steering wheel 100 rigidly attached to the right-hand end thereof and within easy reach of the operator on seat 42. At its inner end and within the housing provided by the head 70 and the caps 73 and 74, the shaft 99 is provided with a head 101 which extends into a diametrical groove 102 (see Fig. 5) which is formed in the right-hand end of the sleeve or cylinder 95. As a consequence of this construction, a turning of the wheel 100 will turn the shell or sleeve 95 therewith. The head 101 is provided with a transverse winged groove 103 into which project abutments 104 which are urged outwardly toward said groove 103 by springs 105. The abutments 104 are provided with heads which fit in the bottoms of bores which receive the springs 105 and thus limit their outward movement into the groove 70. Removable caps 106 are provided on the head 101 and are removably connected thereto by screws 107.

The previously mentioned spider or core 90 extends into and is mounted for rotation with respect to the cylinder or sleeve 95, it being provided at its opposite ends with generally cylindrical end portions having O-ring seals 108 and 109, respectively.

Intermediate its cylindrical ends which are provided with the seals 108 and 109, the spider or core 90 is formed with four longitudinal grooves or troughs 110, 111, 112 and 113 (see Fig. 6). These grooves 110 to 113, inclusive, form four radially extending webs 114 which are preferably 90° apart, as clearly illustrated in Fig. 6 of the drawings. The troughs or grooves 110 to 113, extend along the spider 90 so as to overlap a distance equal to that between the passageways or grooves 75 to 78, inclusive, in the head 70.

The central portion of the spider 90 is provided with a plurality of radial cross bores 115 which are effective to interconnect the grooves or troughs 110 and 112 in one instance, and the grooves 111 and 113 in the other instance. This provides for a completely balanced arrangement of the valve 71.

The shell or cylinder 95 is provided with four radial ports 116, 117, 118 and 119 (see Figs. 6 and 7). There is one of these ports for each of the grooves 75 to 78, inclusive, and these ports 116 to 119, inclusive, are distributed axially along the shell 95 so that one of them is in alignment and communication with each of said passageways 75 to 78 and is individual thereto. For example, port 116, as illustrated in Fig. 7 of the drawings, communicates with and is individual to circumferential passageway or groove 78. These are the return passageway and port of the valve by which hydraulic fluid is conveyed from it to the system for subsequent use under the control of the banked slide valves 45. Port 119 is individual to and communicates with circumferential passageway 77. These are the pressure or feed passageway and port. Port 117 is individual to and communicates with circumferential passageway 76. These are one of the cylinder or motor passageways and ports. Port 118 communicates with and is individual to circumferential passageway 75 which are the other motor or cylinder passageway and port.

Referring particularly to Fig. 6 of the drawings, it will be noted that the angular relation of the center lines of the various ports 116 to 119 is important. If horizontal and vertical lines are drawn, intersecting at the center of the core 90, the center lines of the various ports 116 to 119, inclusive, will be as follows: Center line of port 116 will be forty-five degrees from both vertical and horizontal lines; center line of port 117 will be fifteen degrees from the vertical line. The center line of port 118 will be fifteen degrees from the horizontal line, and the center line of port 119 will be forty-five degrees from both the horizontal and vertical lines.

The right-hand end of the spider 90 is provided with a projection 120, the top and bottom surfaces of which are parallel, said projection extending into the winged groove 103 formed in the head 101 of shaft 99.

As clearly illustrated in Fig. 5 of the drawings, the abutments 104 when in their normal positions as illustrated, just contact the top and bottom surfaces of the projection 120 on opposite sides of the center or axis of rotation of said projection 120 which, of course, is the axis of the spider 90. The wing shape of the groove 103 provides for limited relative rotary movement between the spider 90 and the shell 95 before said projection 120 comes into a solid driving abutment with the walls of said groove 103.

The centering means formed by the springs 105 and abutments 104 have a double function and their effectiveness may be adjusted by adjusting the strength of the springs 105. The first function of these springs is to provide a certain amount of "feel" in the wheel 100 so that when wheel 100 is turned by the operator, there will be a tendency for the rotation of shaft 99 to be transferred mechanically and directly to the shaft 89 through the head 101 and the spider 90 through these spring means 104, 105. However, under most normal conditions the springs 105 will be too weak to transfer any appreciable direct driving movement, though, if desired, they may be made strong enough to provide an appreciable direct mechanical driving connection.

The second function of the spring centering means 104, 105 is to provide a biasing means which will tend to adjust the spider or core 90 to its neutral position with respect to the shell or cylinder 95 and this is particularly desirable to prevent undesirable oscillation of the steering rod 88 in case there is an appreciable lost motion between the mechanical connection to the piston of motor 85 and the stub shaft 89 which will develop particularly in the universal joints in said shaft 89 and the reduction gearing 87.

Attention is directed also to Fig. 7 of the drawings and to a feature of construction of the ports 116 to 119, which are of similar design, port 116 being illustrated in said Fig. 7. In order to maintain the relative angular movement between the shell 95 and the spider 90 at a desired amount and consistent with that provided by the projection 120 and the winged slot 103, it is necessary that the ports 116 to 119 extend over a limited portion of the circumference of the interior surface of shell 95.

As illustrated in Fig. 6 the port 116 is bridged by a web of the spider 90. This, of course, appreciably reduces its effective area or, in other words, the area through which hydraulic fluid can flow, as illustrated in said Fig. 6 by the arrows, when the valve is in its neutral position which is the relative position of the parts as illustrated in said Fig. 6.

In order not to increase unduly the velocity of the fluid when it passes along the sides of said web which bridges the inside of port 116, it is necessary to increase the axial length of the port 116 on the inside surface, as is clearly illustrated in Fig. 7 of the drawings. The outside surface or area of the port 116 can not be increased undesirably in an axial direction because if this were done it would overlap two of the circumferential grooves, such as grooves 77 and 78, or it would undesirably reduce the sealing area between the two adjacent grooves, such as grooves 77 and 78. This outside dimension of the port 116, however, can be circumferentially extended as compared with the circumferential extent of its inside surface and this has been done, as clearly illustrated in said Fig. 6, while maintaining its axial dimension or width substantially equal to that of associated groove 78.

In view of this construction, the effective area of the port 116 is substantially the same on both its outer and inner surfaces when the inner surface is bridged by the above mentioned web. The structures of the ports 117, 118 and 119 are the same as that of port 116.

The operation of the steering mechanism is as follows. Hydraulic fluid is delivered from the pump 92 through the feed conduit 91 and then flows through passageway 81, as indicated by the arrows, and around the circumferential passageway 77 in head 70. It then flows through port 119 in the shell 95 and on opposite sides of a bridging web of spider or core 90 into the grooves or troughs 110, 111. Since trough 110 is connected with trough 112, and trough 111 is connected with trough 113, it is obvious that the hydraulic fluid would be flowing in all four of the troughs 110 to 113, inclusive, throughout their full lengths. As a consequence, the oil flowing in troughs 111 and 112 will flow through the port 116 on opposite sides of the web of spider 90 which bridges the interior opening thereof, flowing into the circumferential passageway 78 in head 70, as clearly illustrated in Figs. 4 and 6 of the drawings. As previously stated, this is the normal or neutral position of the valve 71 and no steering operation is effected.

The hydraulic fluid in the troughs 110 to 113, inclusive, is free to flow through the conduits 83 and 84 by way of circumferential passageways 75 and 76 and connecting passageways 79 and 80, but this is appreciably without effect on the hydraulic steering motor 85 or if it does have any effect thereon due to the unbalanced nature of said hydraulic jack, this will cause an automatic correcting movement of the spider 90.

The oil or hydraulic fluid flowing downwardly through passageway 82 continues through said passageway into the base 69 of post 68, thence to conduit 94 from where it flows to the end plate 48 and thus is delivered through the port 58 of the right-hand valve 45, as viewed in Fig. 3 of the drawings.

Assuming that all of said valves 45 are in their neutral or normal positions, the hydraulic fluid flows through all of said valves in series as indicated by the arrows in Fig. 3 of the drawings and flows through a by-pass passageway 121 in the base 69 of post 68 which acts as a connecting passageway between the two valves 45 on opposite sides of the post assembly 46.

This passageway through all of said valves 45 and the bottom of post assembly 46 provides a no-load pass for the hydraulic fluid which on leaving the last valve 45, flows into the end plate 47 which is provided with a passageway connecting it to return or tank pipe 122. Thus, under normal conditions, there is a no-load circuit through all of the control valves from the pump 92 to the tank 93.

If the steering wheel 100 is turned in a clockwise direction by the operator, the angular movement thereof will produce equal angular movement of the shell 95 by virtue of the head 101 fitting snugly in the groove 102 formed in the right-hand end of said cylinder 95. This clockwise rotation of the shell 95 will cause it to rotate with respect to the spider 90 which will be held against movement by the mechanical linkage including the steering rod 88 which, under the conditions just described, is connected to the piston end of the motor 85 which, at the moment, is stationary. The relative movement between shell 95 and spider 90 just described will connect pressure port 119 to interconnected troughs 111 and 113 and will connect discharge port 116 to interconnected troughs 110 and 112. The hydraulic fluid in passageway 81 will thereupon flow through circumferential passageway 77, port 119, groove or trough 111 and the radial bores 115 in spider 90 to trough or groove 113; thence by port 118 through circumferential passageway 75 and post passageway 79 to conduit 83 which leads to the hydraulic motor 85. Thus, hydraulic fluid will be delivered to operate the double acting hydraulic piston motor or cylinder 85.

The return path for the hydraulic fluid from the hydraulic cylinder or motor 85 will be by way of conduit 84, post passageway 80, circumferential passageway 76, port 117, groove or trough 112, port 116, and circumferential passageway 78 to the post passageway 82 which delivers it to conduit 94 and thence to the group of banked valves 45 in series as above described.

The steering movement of the front wheels 24 in response to operation of the motor 85 will be reflected in angular movement of the steering rod 88 which is connected to the spider 90 as above described, so as to produce a follow-up type of system so that whenever the wheels 24 have been adjusted a variable amount as determined by the variable movement of the wheel 100, the relative position of the cylinder 95 and the spider 90 will be restored to that illustrated in Fig. 6, or, in other words, to their normal position.

Thus in effect the operation of the steering valve 71 simulates ordinary mechanical steering except that hydraulic power is provided to do the actual work. As previously mentioned, in case of failure of the hydraulic system, it is only necessary to disconnect the piston head of the motor 85, so as not to be working against it, and a direct mechanical drive is provided from the wheel 100, shaft 99, head 101, projection 120, spider 90, shaft 89, steering shaft 88 and reduction gearing 87, to the steering shaft 86. Of course, the mechanical steering linkage above described exists even though motor 85 is not disconnected, but disconnection thereof is preferred if mechanical steering is necessary, so as to reduce appreciably the amount of energy required for the mechanical steering.

In view of the fact that the hydraulic circuit is a series circuit, it is obvious that the hydraulic fluid flowing in conduit 94, regardless of whether the steering valve is in its neutral position or is in a position to deliver hydraulic fluid to the motor 85, may be employed to operate any one or more of the double acting or reversible hydraulic motors controlled by the individual valves 45. That is, with this system, any number of control valves, including the rotary control valve, from one to the maximum number, may be operated simultaneously.

The steering valve 71 is operable upon counterclockwise rotation of the wheel 100 in a manner which is comparable to that above described so that power steering may be effected by turning the wheel in either direction.

In the base 69 of the casting 68, I provide a pair of high pressure relief by-pass valves 123 and 124 which are of duplicate construction, but which provide different functions. The by-pass valve 123 by-passes the rotary valve 71 and it is preferably set to open at a pressure differential which is lower than that at which by-pass valve 124 opens. The function of the by-pass valve 124 is to provide a by-pass to tank whenever a high pressure condition exists anywhere in the system, except on the input side of the double acting motor 85, but this by-passing of the fluid only discharges the fluid to tank after it has passed through the rotary valve 71 or through its individual relief valve 123.

The relief valve 123 provides a high pressure by-pass for the valve 71 since it is interconnected between feed passageway 81 and discharge passageway 82 and obviously upon the appearance of a predetermined high pressure in conduit 91 or passageway 81 as compared with the pressure in passageway 82, this high pressure relief valve will open, providing a by-pass around valve 71, thus directing the fluid from conduit 91 through the passageways in by-pass valve 123 to the lower portion of passageway 82 and into the feed pipe or conduit 94.

The structures of the high pressure valves 123 and 124 are of essentially standard design and thus need no detailed explanation. It may be pointed out, however, that a hollow spring-pressed valve closing piston 145 of each is provided with a port 146 so that hydraulic fluid in the passageway 82 will be present on both sides of the piston 145 and hydraulic fluid flowing through passageway 126 in valve 124 will also be on both sides of its piston 145. This is of particular importance in connection with relief valve 123 because it insures that whatever the pressure in passageway 82, by-pass valve 123 will only open in response to a higher predetermined pressure in passageway 81 determined by the adjustment of the spring of valve 123. For example, if valve 123 is adjusted to open at 200 pounds per square inch and valve 124 at 500 pounds per square inch, and should the double acting motor controlled by one of the slide valves 45, reach the end of its stroke and thus cause the 500 pounds pressure to appear in conduit 82 and thereby cause valve 124 to open, valve 123 would only open when the pressure in passageway 81 reached 700 pounds. Because of this fact there is always hydraulic pressure available to control the steering of the vehicle even though the pressure relief valve 124 is open for any reason. This is an important feature of the hydraulic system of my invention. The pressures at which the valves 123 and 124 open may be varied by adjusting their compression springs. It is to be noted that valve 123 in no way controls or restricts flow of fluid through the passageway 82 but only controls flow from passageway 81 to passageway 82, since fluid in passageway 82 flows freely around that portion of piston 145 of valve 123 which extends into said passageway 82 which is enlarged by a chamber adjacent said piston 145.

It is to be particularly noted that, regardless of whether the hydraulic fluid flowing through conduit 91 is by-passed by the by-pass valve 123 or flows through the valve 71 and the motor 85, it is always delivered to the lower portion of passageway 82 and to conduit 94. If, however, high pressure relief valve 124 is actuated, the hydraulic fluid will be by-passed thereby through a tank passageway which extends through aligned individual passageways 125 (see Fig. 8), in each of the individual castings or bodies of valves 45. That is, the individual passageways 125 of valves 45 are in alignment and form a continuous passageway through the manifold formed by banked valves 44, being connected together by a similar aligned passageway 126 (see Fig. 4) formed in the base 69 of casting 68. In addition, the end plate 47 has a passageway which is in communication with said individual aligned passageways 125, which passageway is connected to the tank pipe or conduit 122.

As above mentioned, the principal function of the individual passageways 125 is to provide a drain passageway through the manifold of banked valves 44 for leakage around the spools 53 of valves 45, there being drain bores 127 (see Fig. 8) from the chambers formed in the top and bottom caps or heads 128 and 129 of the individual valves 45. This construction is disclosed and claimed in my application, Serial No. 627,848 above identified.

In Figs. 9, 10 and 11 of the drawings, I have disclosed a modified form of steering post assembly 246 which may be substituted for steering post assembly 46. It is to be understood that unless a contrary fact is indicated, the steering post assembly 246 follows the structure of steering post assembly 46. One difference therein is in the structure of the head or cylindrical portion 270. Said head portion 270 is provided at its top with a drain passageway 130 which extends from the front to the rear thereof and opens into the cylindrical bore 72 at both ends.

The post 246 includes a main body casting or casing 268 which in addition to the four passageways 79, 80, 81 and 82, is provided with a drain passageway 131 which receives leakage fluid collected from a rotary steering valve 271 and delivers it to the drain passageway 126. The rotary steering valve 271 differs from the steering valve 71 in a number of particulars. In the first place, the O-ring seals 97, 98, 108 and 109 have been eliminated and the leakage of the valve parts is drained off by the passageways 130 and 131. Furthermore, in place of shell, sleeve or cylinder 95, I employ a different shell, sleeve or cylinder 295 which is provided with a pair of diametrically opposed ports, as viewed from its interior surface, associated with each of the cylindrical passageways or grooves 75, 76, 77 and 78. Diametrically opposed ports 219 communicate with passageway 78; diametrically opposed ports 216 communicate with passageway 77; diametrically opposed ports 217 communicate with passageway 76; and diametrically opposed ports 218 communicate with passageway 75.

It is to be noted by reference particularly to Fig. 10 of the drawings, that the ports 217 and 218 do not extend radially through the shell 295, but extend parallel with the ports 219. This is to provide for forming of the sand cores to make the shell 295 so that the core patterns can be separated without destroying the dry sand cores. Functionally, the operation would be the same if all of the ports 216 to 219, inclusive, extended radially through the shell 295.

The spider or core 290 also differs from the spider or core 90 not only in the elimination of the O-ring seals, but also in the elimination of the equalizing cross bores 115. These are not necessary to produce a balanced condition in the valve because of the presence of the diametrically opposed ports 216 to 219, inclusive.

It is also to be noted by reference particularly to Fig. 11 of the drawings that I no longer employ the particular form of port comparable to port 116, as illustrated in Fig. 7 of the drawings. It is to be distinctly understood, however, that the ports 216 to 219, inclusive, may follow the design of said port 116 of Fig. 7.

It is also to be noted that I have eliminated the centering spring means 104, 105 and the shaft 99 is provided with a substantially solid head 201 provided with a winged shaped groove 203. If desired, the spring means 104 and 105 disclosed in detail in Figs. 4 and 5 of the drawings, may be employed with the valve 271. In other words, shaft 99, head 101, and associated spring means 104—107 of Figs. 4 and 5 may be employed instead of that illustrated in Fig. 9 of the drawings.

Furthermore, in case these spring means are eliminated, or, in other words, in case the structure shown in Fig. 3 is employed, it may be desirable to add a certain amount of friction to rotation of the shaft 99 and one easy way to accomplish this is to provide an O-ring seal on the shell 295 comparable to the O-ring seal 97 or 98.

To provide free drainage of the oil which is received in the upper drain passageway 130, the head 201 is provided with a circumferential notch, recess or groove 132 which provides a circumferential passageway interconnecting the top passageway 130 and the drain passageway 131.

Except for the action of the spring means 104—107 previously described, the action of the rotary steering valve 271 is essentially the same as that of the rotary steering valve 71. This valve 271 also provides a direct mechanical drive in case of emergency, since the core or spider 200 is provided with a projection 220 which projects into the previously mentioned winged groove 203.

Except for the differences above mentioned, the post assembly 246 is essentially the same as the post assembly 46 and either may be substituted in the hydraulic system, for the other.

In Figs. 12, 13 and 14 of the drawings, I have illustrated a modified form of banked valves 44 which provide a manifold which differs from those previously described, in a number of particulars. First of all, instead of the post assembly 46 or 246, I have substituted a post assembly 346, the base of which is formed by a standard valve 345 which is substantially identical, except for its operating mechanism, with the slide valves 45. Furthermore, the method of delivering hydraulic fluid to the manifold formed by the bank of individual valves 45 is different, and to this end the end plates 347 and 348 are of slightly different structure. The end plate 347 has built into it a high pressure relief by-pass valve 323 and a manually adjusted bleeder valve 133. These structures are disclosed in detail in Fig. 14 of the drawings.

In this hydraulic system of Figs. 12, 13 and 14, the feed pipe 91 leads to a passageway in the body or casting 135 of end plate 347. Passageway 134 leads through a cross bore 136 in a hollow and radially bored valve seat ring 137, the radial bores of which communicate with a peripheral passageway 138 which communicates with a port which in turn communicates with the port 60 of the left-hand or first individual control valve 45 of the bank.

In the hydraulic system of said Figs. 12, 13 and 14 the flow of fluid through said valves 45 when they are all in their neutral positions, will be from the left to the right, as viewed in Fig. 12, instead of from the right to the left as is the situation with the system of Fig. 3. This is a matter of no significance insofar as the operation of the system or any of the valves is concerned. As a consequence of this fact, the end plate 348 is provided with a drain or tank passageway which is connected to the drain or tank pipe or conduit 122.

In some hydraulic systems it is desirable to bleed off some of the output of the hydraulic pump and in order to do this, I provide the manually operable bleeder valve 133 which includes an adjustable stem 140 having a tapered nose 141 fitting in a tapered or frusto-conical opening between a chamber 142 and the previously described passageway 138. Chamber 142 is connected to a passageway 143 which registers with the drain passageway 125 of the first slide valve 45.

Obviously, by adjusting the needle or stem 140, the amount of fluid by-passed from the passageway 134 to the tank or drain passageway formed by the individual valve passageways 125, may be adjusted. This bleeder valve 133 may, if desired, be shut off completely.

The high pressure relief by-pass valve 323 is essentially of standard construction and whenever the normally seated plunger 144 is unseated, the pressure passageway 134 is connected through bore 136 to the passageway 143 and the fluid by-passed through the drain passageways 125 to the tank or return pipe or conduit 122. To this end, the end plate 348 also provides a connection from the passageway 125 of the last or adjacent valve 45 connecting it to said pipe or conduit 122.

A hollow steering post 147 is supported from the top of the valve 345 and at its upper end is provided with a rearwardly extending bearing arm 148 (see Fig. 13), which receives and supports the shaft 149 of a steering wheel 150. The forward or inner end of the shaft 149 is provided with a crank arm 151 the outer end of which is pivotally attached to an operating rod 152 which at its lower end is bifurcated and pivoted to the upper end of the spool shaft of valve 345. The shaft 149 also is provided with a rigidly attached collar 153 having a pair of wing stops 154 extending on opposite sides thereof, which co-operate with individual adjustable spring stop members 155 mounted on a pair of laterally extending brackets formed on the bearing arm 148.

The operation of the valve 345 is essentially the same as that of each of the valves 45, except that the reverse shifting of the spool is effected through the mechanism just described, by reverse rotation of the wheel 150 from its neutral or normal position in which it is automatically centered when the wheel is released.

When the steering valve arrangement of Figs. 12, 13 and 14 is provided, it is obvious that there is no mechanical steering possible and the system is not of the follow-up type. As a consequence, the mere turning of the wheel 150 either in a clockwise or counter-clockwise direction from its neutral position, will start the turning of the steering wheels and the wheels will continue to turn so long as the wheel 150 is retained in either of these operating positions. Because of this construction, the steering rod 88 and reduction gearing 87 are eliminated, and the arrangement of the hydraulic motor for operating the shaft 86 is essentially the same as that disclosed in the Arndt patent above identified.

It may be mentioned that in view of the fact that the base of the post assembly 46 has the same width as a valve 45 or valve 345, it is possible to substitute a valve 345 for the post assembly 46 in a banked valve manifold. This, of course, will require in addition a rearrangement of the hydraulic circuit from that of Fig. 3 to that of Fig. 12 and an elimination of the steering rod 88 and reduction gearing 87. Conversely, a system like that of Figs. 12, 13 and 14 may be modified to become one like that of Figs. 1 to 4, inclusive, by substituting the post assembly 46 for the valve 345 and adding those parts which are necessary to provide a complete system as disclosed in said Figs. 1 to 4, inclusive.

Furthermore, a simplification of the post assembly 46 or 246 may be effected by eliminating the high pressure relief by-pass valve 123 and eliminating its function. If this valve 123 is eliminated, a modification in the circuit is highly desirable, since the relief valve 124 should be ahead of the valve 71 instead of following it in the circuit. This can be effected if relief valve 123 is eliminated, simply by interchanging the conduit connections 91 and 94 with respect to the base 69 of the post assembly 46 or 246. In the more complete aspect of my invention, however, I prefer to employ both relief valves 123 and 124.

From the above description, it is obvious that when the mechanism of Figs. 1 to 8 or a modification thereof, as disclosed in Figs. 9, 10 and 11, is employed, I have a hydraulic system and apparatus in which the steering wheels of a vehicle may be steered either by hydraulic power or mechanically. Furthermore, when hydraulic steering is employed, hydraulic pressure is always available for steering, even if a motor associated with one of the control valves 45 is at the end of its stroke and the high pressure relief or by-pass valve 124 is open. Furthermore, should the operator turn the wheel 100 and cramp the front wheels 24 or otherwise stall them so they could travel no more, so that high pressure relief valve 123 opens, the rest of the system would still not be disabled because the hydraulic fluid is delivered to the other valves of the system, regardless of whether it is delivered through the motor 85 or through the by-pass valve 123, since in either instance it is delivered to the passageway 82 and conduit 94.

Certain features of the invention herein disclosed, including the banked valve arrangement either with or without the steering post, are claimed in my divisional application Serial No. 664,662, filed April 24, 1946, and the structure of the steering post, per se, and all the associated rotary valve construction are claimed in my divisional application Serial No. 665,530, filed April 27, 1946.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. In a vehicle, the combination with a frame, of a steerable wheel member therefor, a hydraulic motor for actuating said steerable wheel member to steer said vehicle, at least two operating mechanisms on said frame, an individual hydraulic actuating motor for each of said operating mechanisms, a hydraulic system for controlling all of said motors, said system including an individual valve for each of said motors, said hydraulic system including said valves being constructed and arranged whereby hydraulic fluid is delivered first to the steering motor control valve and then to said other valves in series, and a passageway provided in said steering motor control valve interconnecting said two other valves in series as aforesaid and interposed between them.

2. In a vehicle, the combination with a frame, of a steerable wheel member therefor, a hydraulic motor for actuating said steerable wheel member to steer said vehicle, at least two operating mechanisms on said frame, an individual hydraulic actuating motor for each of said operating mechanisms, a hydraulic system for controlling all of said motors, said system including an individual valve for each of said motors, said hydraulic system including said valves being constructed and arranged whereby hydraulic fluid is delivered first to the steering motor control valve and then to said other valves in series, a passageway provided in said steering motor control valve interconnecting said two other valves in series as aforesaid, a by-pass valve in said steering motor control valve, a drain passageway in at least the last of said other valves, and a passageway in said steering motor control valve connecting the output of said by-pass valve to said last other valve drain passageway.

3. In a vehicle, the combination with a frame, of a steerable wheel member therefor, a hydraulic motor for actuating said steerable wheel member to steer said vehicle, a plurality of operating mechanisms on said frame, a hydraulic motor for actuating each of said operating mechanisms, a hydraulic system for controlling all of said motors, said system including an individual valve for each of said motors, said hydraulic system including said valves being constructed and arranged whereby hydraulic fluid is delivered in sequence first to the steering control valve, then to one or more of said motor controlling valves, then through a passageway in said steering control valve, then to one or more other motor controlling valves, and a high pressure relief valve for by-passing only said steering control valve.

4. In a vehicle, the combination with a frame, of a steerable wheel member therefor, a double acting hydraulic motor for actuating said steerable wheel member to steer said vehicle, a plurality of operating mechanisms on said frame, a hydraulic motor for actuating each of said operating mechanisms, a hydraulic system for controlling all of said motors, said system including an individual valve for each of said motors, said hydraulic system including said valves being constructed and arranged whereby hydraulic fluid is delivered first to the steering control valve and then to the other valves, some of said other valves being disposed at one side of said steering control valve and others at the other side thereof, said other valves having drain passageways, the drain passageways of the valves on each of the opposite sides of said steering valve being in communication with each other, a connecting passageway in said steering control valve interconnecting the drain passageways of the other valves on opposite sides of said steering control valve, and a pair of high pressure relief valves, one serving to by-pass only said steering control valve and operative to deliver hydraulic fluid for use to said other valves, the second for relieving a high pressure anywhere in the system following said steering control valve and by-passing the fluid, said second relief valve having a passageway directing said by-passed fluid to the drain passageway of at least one of said other valves by which it is discharged.

FRED J. WRIGHT.

REFERENCES CITED

The following references are of record in the file of this patent:

UNITED STATES PATENTS

| Number | Name | Date |
|---|---|---|
| 1,719,875 | Cooper | July 9, 1929 |
| 1,910,600 | Fitch | May 23, 1933 |
| 1,991,227 | Proctor et al. | Feb. 12, 1935 |
| 2,030,902 | Vickers | Feb. 18, 1936 |
| 2,051,137 | Galleher | June 18, 1936 |
| 2,182,459 | Vickers | Dec. 5, 1939 |
| 2,244,471 | Nichols | June 3, 1941 |
| 2,403,325 | Armington | July 2, 1946 |

FOREIGN PATENTS

| Number | Country | Date |
|---|---|---|
| 524,096 | Great Britain | July 30, 1940 |